March 8, 1932.  F. L. GATCHET  1,848,708
SPRAYING DEVICE
Filed May 7, 1929
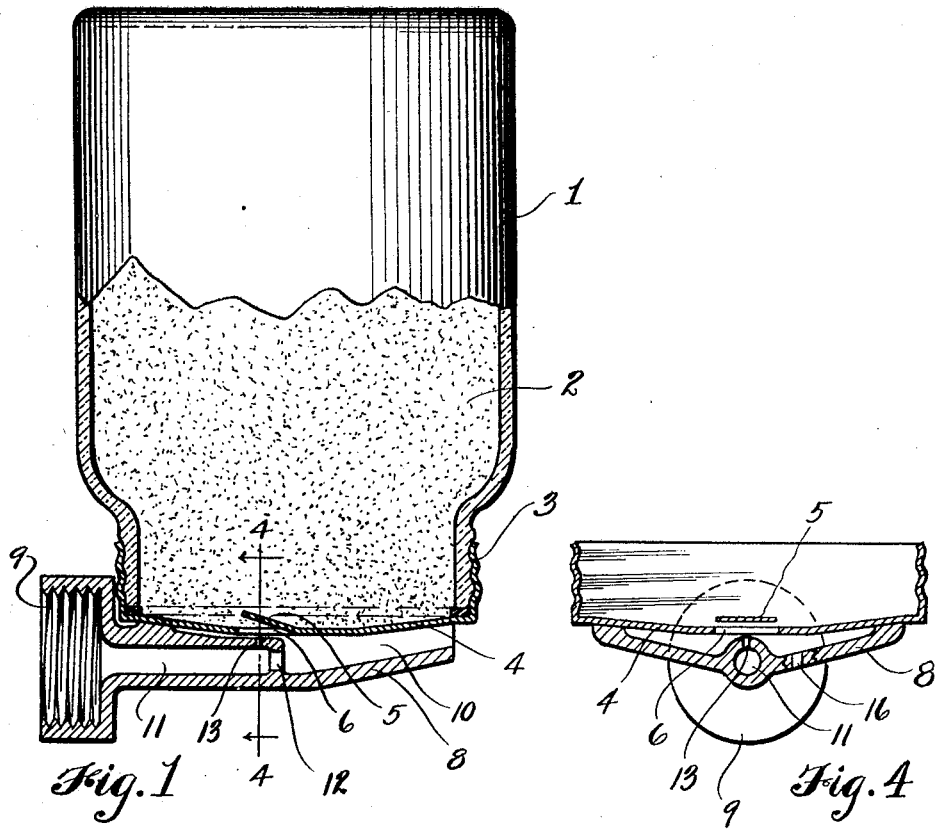
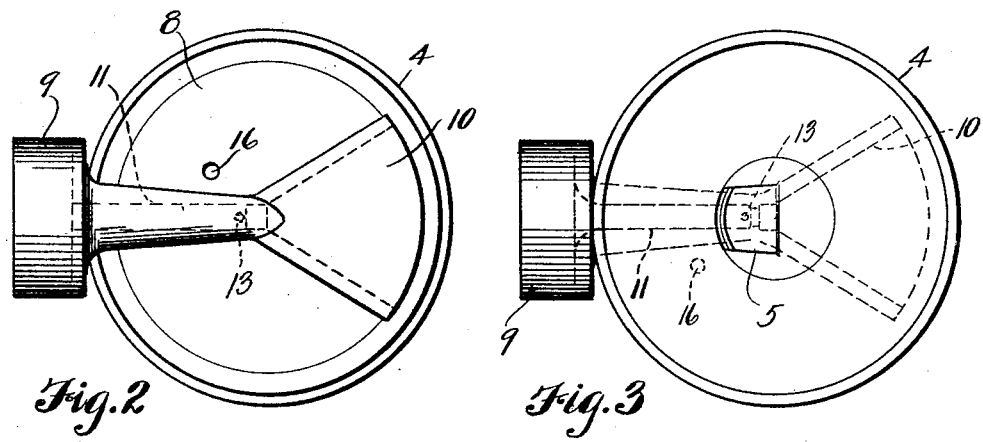
INVENTOR
FRANCIS L. GATCHET
BY
Cook & Robinson
ATTORNEY Patented Mar. 8, 1932

1,848,708

UNITED STATES PATENT OFFICE

FRANCIS L. GATCHET, OF SEATTLE, WASHINGTON, ASSIGNOR TO F. L. GATCHET, INC., OF SEATTLE, WASHINGTON, A CORPORATION OF WASHINGTON

SPRAYING DEVICE

Application filed May 7, 1929. Serial No. 361,077.

This invention relates to improvements in spray devices and is in the nature of an improvement on the spray device described and illustrated in my co-pending application filed January 10, 1928, Serial Number 245,731.

The present device may more specifically be designated as a means for dissolving and for spraying of commercial fertilizer, or the like, and has for its principal object to provide a device for the above purpose that is designed to be applied to the threaded opening of the ordinary type of glass jar within which the dry fertilizer is placed, and which also has provision for connection with a garden hose.

It is also an object of the invention to so construct the device that a small quantity of water will be delivered into the jar to dissolve the material, and the solution, as it is formed, will be drawn into the spray nozzle and discharged from the device with the water spray.

Commercial fertilizer, for which the present device is especially intended, is prepared in granulated form and heretofore the customary way of using it was to dissolve a certain quantity in a certain amount of water and then spray or sprinkle this solution over the area desired to be treated. Another method was to sprinkle the material directly over the area and then spray this with water. Neither of these methods is entirely satisfactory for the reason that an even distribution is impossible and it frequently happens that too much is placed in one spot and damage to vegetation results therefrom. It is for the purpose of overcoming these undesirable results that the present spray device has been devised; also, to overcome certain objections to the device of my co-pending application resulting from clogging of small pipes and orifices that were employed in this prior device.

Another object of the invention is to provide a spray by which the material will be used as it is dissolved and all unused material in the container will remain dry.

Other objects of the invention reside in the various details of construction and combination of parts whereby the above results are accomplished, as will hereinafter be described.

In accomplishing these objects, I have provided the improved details of construction, the preferred forms of which are illustrated in the accompanying drawings, wherein—

Figure 1 is a vertical, sectional view of a spray device embodied by the present invention, as attached to a fertilizer container ready for use.

Figure 2 is an underside view of the spray device.

Figure 3 is a top view of the same.

Figure 4 is a sectional detail taken on the line 4—4 in Figure 1.

Referring more in detail to the drawings—

1 designates a container, here shown to be a glass jar of a common, well known type, within which a quantity of fertilizer of granular form, as designated at 2, is contained. In use, the jar is inverted, as shown in Figure 1, and threaded onto the mouth of the jar, as at 3, to sustain the material is a closure in the form of a cap 4, having a downwardly depressed end portion from which an ear 5 is stamped inwardly, thereby forming an outlet 6; the ear also being disposed in an inclined position above the opening so as to prevent any ready flow of material therefrom and also serving as a deflector, as will presently be described.

Secured to the cap, by soldering, welding or in any other suitable manner, is a spray device consisting of a one-piece casting 8 which is provided at one side with an integrally formed, internally threaded nipple 9 for the attachment thereto of a hose or pipe and, at the opposite side, there is provided a flattened, laterally flared nozzle 10 connected with the nipple by a passage, or channel, 11. This channel is slightly restricted at a point where it joins the nozzle portion, as at 12, and a small orifice 13 opens upwardly from the channel directly into the opening 6 in the cover. A small amount of water delivered through the channel passes through this orifice and against the upturned ear and is deflected thereby into the base of the container. The material with which the water comes in contact is quickly dissolved and the solution flows out through the opening 6 and into the nozzle passage. It is to be noted by reference to Figure 1 of the drawings, that the opening that is provided by pressing the ear 5 upwardly from the cover portion communicates also with the nozzle passage and that the upper surface of the nozzle passage is closed or covered by the end wall of the cap 4.

In order that air may be admitted to the container as the fertilizer is dissolved and withdrawn, I have provided a small air port 16 in the casting and this opens into a narrow space between the cover and the casting and, through this space, communicates with the opening 6 and interior of the glass jar. It is readily apparent that such an opening is necessary, if the jar is otherwise tightly closed.

With the device so constructed, it is used as follows:

First, the container, or jar, is filled with the dry, granular, fertilizing material. The spray device is then threaded onto the jar and the hose attached to the nipple 9. When water is delivered through the hose and nozzle, the container is inverted, as shown in Figure 1, and the fertilizer material as it is dissolved by the delivery of water into the base through the small orifice 13 and opening 6, is drawn out through opening 6 and into the spray nozzle and is mixed with the water as it is discharged by the spray. The solution is withdrawn from the container as fast as it is formed and thereby leaves the main supply of material within the container in a dry condition.

Devices of this character provide a convenient, practical and economical way of distributing commercial fertilizer and other materials, such as concentrated insect poison, without any danger of damage to vegetation by applying too much in any one place. Such devices may be made to fit jars of the standard makes.

Having thus described my invention, what I claim as new therein and desire to secure by Letters-Patent, is:

1. A device of the character described comprising a cap removably applicable to a container as a closure therefor, in such manner that material in the container will pass thereinto by gravity flow and a spray device applied to the cap and comprising a channel provided at one end with means for connection with a water supply and having a restricted outlet at its opposite end opening into a spray nozzle; said cap having an ear formed upwardly therein and thereby providing an opening that communicates with the spray nozzle at a point at which passage of water through the spray nozzle will create suction to withdraw material from the container and said channel having a lateral port through which a small amount of water will be directed into the container through said opening.

2. A device as in claim 1, wherein the spray device is provided with a port to atmosphere through which air will be admitted into the container through the cap opening; said port being located at a point rearwardly of the spray nozzle to create an inward suction of air past the container opening.

3. A device as in claim 1, wherein the said ear acts to retain flow of undissolved material from the container into the nozzle.

Signed at Seattle, Washington, this 23 day of February 1929.

FRANCIS L. GATCHET.